United States Patent
Shim et al.

(10) Patent No.: US 11,333,222 B2
(45) Date of Patent: May 17, 2022

(54) POWER TRANSMISSION APPARATUS OF HYBRID ELECTRIC VEHICLE

(71) Applicants: Hyundai Motor Company, Seoul (KR); Kia Motors Corporation, Seoul (KR)

(72) Inventors: Hyu Tae Shim, Hwaseong-Si (KR); Bong Hyun Cho, Gunpo-Si (KR); Jae Young Jeon, Osan-Si (KR); Byung Dae Choi, Seoul (KR); Hyung Min Kim, Suwon-Si (KR); Jin Yong Kim, Incheon (KR); Gwang Soo Hwang, Hwaseong-Si (KR); Jun Seong Kang, Gwacheon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/831,563

(22) Filed: Mar. 26, 2020

(65) Prior Publication Data

US 2021/0180666 A1 Jun. 17, 2021

(30) Foreign Application Priority Data

Dec. 11, 2019 (KR) .......................... 10-2019-0164614

(51) Int. Cl.
*F16H 3/72* (2006.01)
*B60K 6/442* (2007.10)
(Continued)

(52) U.S. Cl.
CPC ............. *F16H 3/724* (2013.01); *B60K 6/365* (2013.01); *B60K 6/387* (2013.01); *B60K 6/442* (2013.01);
(Continued)

(58) Field of Classification Search
CPC ..... F16H 2200/2094; F16H 2200/2046; F16H 2200/2007; F16H 3/724; F16D 25/061; F16D 11/10; B60K 6/387; B60K 6/365
See application file for complete search history.

(56) References Cited

U.S. PATENT DOCUMENTS

2007/0072725 A1 * 3/2007 Bucknor ................. F16H 3/728
 475/5
2019/0078665 A1 * 3/2019 Beck .......................... F16H 3/66

FOREIGN PATENT DOCUMENTS

WO WO-2018143172 A1 * 8/2018 ............. F16D 67/02

* cited by examiner

*Primary Examiner* — Stacey A Fluhart
(74) *Attorney, Agent, or Firm* — Morgan, Lewis & Bockius LLP (57) ABSTRACT

A power transmission apparatus of a hybrid electric vehicle includes an input shaft configured of receiving an engine torque, a motor shaft configured of receiving a torque of a motor/generator, first and second planetary gear sets respectively having first to third rotation elements and fourth to sixth rotation elements, a first shaft connected to the first rotation element and selectively connectable to each of the input shaft and the motor shaft, a second shaft fixedly connecting the second and fifth rotation elements, and selectively connectable to the input shaft, the motor shaft, and a transmission housing, respectively, a third shaft fixedly connecting the third and fourth rotation elements and selectively connectable to the transmission housing, a fourth shaft fixedly connecting the sixth rotation element and an output gear, and a plurality of engagement elements including at least one clutch and at least one brake.

6 Claims, 7 Drawing Sheets

(51) Int. Cl.
    *B60K 6/365*          (2007.10)
    *B60K 6/387*          (2007.10)
    *B60K 6/547*          (2007.10)
    *B60K 6/543*          (2007.10)
    *F16D 11/10*          (2006.01)
    *F16D 25/061*         (2006.01)
    *F16H 63/30*          (2006.01)
    *B60K 6/38*           (2007.10)

(52) U.S. Cl.
    CPC .............. *B60K 6/543* (2013.01); *B60K 6/547*
        (2013.01); *F16D 11/10* (2013.01); *F16D*
        *25/061* (2013.01); *F16H 63/3026* (2013.01);
        *B60K 2006/381* (2013.01); *F16H 3/725*
        (2013.01); *F16H 2063/3093* (2013.01); *F16H*
        *2200/0021* (2013.01); *F16H 2200/0043*
        (2013.01); *F16H 2200/201* (2013.01); *F16H*
        *2200/2007* (2013.01); *F16H 2200/2025*
        (2013.01); *F16H 2200/2041* (2013.01); *F16H*
        *2200/2046* (2013.01); *F16H 2200/2064*
        (2013.01); *F16H 2200/2094* (2013.01)

| Category | | Engagement element | | | | | |
|---|---|---|---|---|---|---|---|
| | | C1 | C2 | B1 | B2 | DC(TWS) | |
| | | | | | | D1 | D2 |
| Engine mode (parallel hybrid mode) | 1st | ● | | ● | | (●) | |
| | 2nd | ● | | | ● | (●) | |
| | 3rd | ● | ● | | | (●) | (●) |
| | 4th | | ● | | ● | | (●) |
| eCVT mode | eCVT1(UD1) | ● | | | | | ● |
| | eCVT2(UD2) | | ● | | | ● | |
| EV mode | 1st | | | ● | | ● | |
| | 2nd | | | | ● | ● | |
| | 3rd | | | | | ● | ● |
| | 4th | | | | ● | | ● |
| Recharging mode (vehicle stopped) | | ● | | | | ● | |

● : Operated
(●) : Operated in hybrid mode and regenerative braking

FIG. 4

| Category | | Engagement element | | | | | |
|---|---|---|---|---|---|---|---|
| | | C1 | C2 | B1 | B2 | TWS | |
| | | | | | | D1 | D2 |
| eCVT mode | eCVT1(UD1) | ● | | | | | ● |
| | eCVT2(UD2) | | ● | | | ● | |
| Engine mode (parallel hybrid mode) | 1:1 | ● | ● | | | (●) | (●) |
| | OD | | ● | | ● | | (●) |
| EV mode | 1st | | | ● | | ● | |
| | 2nd | | | | ● | ● | |
| | 3rd | | | | | ● | ● |
| | 4th | | | | ● | | ● |
| Recharging mode (vehicle stopped) | | ● | | | | ● | |

● : Operated
(●) : Operated in hybrid mode and regenerative braking

POWER TRANSMISSION APPARATUS OF HYBRID ELECTRIC VEHICLE

CROSS-REFERENCE TO RELATED APPLICATION

The present application claims priority to Korean Patent Application No. 10-2019-0164614 filed on Dec. 11, 2019, the entire contents of which is incorporated herein for all purposes by this reference.

BACKGROUND OF THE INVENTION

Field of the Invention

The present invention relates to a power transmission apparatus of a hybrid electric vehicle.

Description of Related Art

An environment-friendly technology of a vehicle is a core technology which controls survival of a future vehicle industry, and advanced vehicle makers have focused their energy on the development of an environment-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the conventional fossil fuel and a motor/generator driven by electrical energy are mixed and used as the power sources.

In the hybrid electric vehicle, an EV mode in which the hybrid electric vehicle is driven by only the motor, an HEV mode using both the engine and the motor, and an ENG mode using only the engine may be implemented according to the combination of the engine and the motor. Furthermore, the hybrid electric vehicle can provide a significant improvement of fuel efficiency through an idle stop function of stopping the engine when the vehicle stops, and also through a regenerative braking, where a motor/generator is driven as a generator to generate electricity by a kinetic energy of the vehicle under a braking situation, such generated electricity is stored in a battery, and the stored electricity is reused in driving the vehicle.

A transmission for hybrid electric vehicle performs shifting operation based on torques of the engine and the motor/generator. Such a transmission may realize multi-speed, e.g., six speeds, of various modes by additionally employing an engine clutch to be variably connected to the engine to a traditional multi-speed, e.g., six-speed, automatic transmission.

Such a transmission for a hybrid electric vehicle may typically include three planetary gear sets, six operational elements, and at least one one-way clutch OWC, similarly to a conventional six-speed automatic transmission, as well as the additional engine clutch. By such a scheme, the transmission for a hybrid electric vehicle may not be understood to be best optimized for a hybrid electric vehicle, and may be improved to provide better efficiency, better performance, and better fuel consumption, and/or less production cost.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus of a hybrid electric vehicle having advantages of while simplifying the structure of a transmission, providing various shifting modes, such as an engine mode and a parallel hybrid mode respectively having a plurality of speeds, an electronically-controlled continuously variable shifting mode (eCVT mode), and an electric vehicle mode (EV mode), reducing a production cost, and realizing fuel consumption characteristic and power performance above an equivalent transmission An exemplary power transmission apparatus of a hybrid electric vehicle includes an input shaft configured of receiving an engine torque, a motor shaft configured of receiving a torque of a motor/generator, a first planetary gear set having first, second, and third rotation elements and mounted on the input shaft, a second planetary gear set having fourth, fifth, and sixth rotation elements and mounted on the input shaft, a first shaft connected to the first rotation element and selectively connectable to each of the input shaft and the motor shaft, a second shaft fixedly connecting the second rotation element and the fifth rotation element, and selectively connectable to the input shaft, the motor shaft, and a transmission housing, respectively, a third shaft fixedly connecting the third rotation element and the fourth rotation element and selectively connectable to the transmission housing, a fourth shaft fixedly connecting the sixth rotation element and an output gear, and a plurality of engagement elements including at least one clutch and at least one brake.

The first planetary gear set may be formed as a single pinion planetary gear set having a first sun gear as the first rotation element, a first planet carrier as the second rotation element, and a first ring gear as the third rotation element. The second planetary gear set is formed as a single pinion planetary gear set having a second sun gear as the fourth rotation element, a second planet carrier as the fifth rotation element, and a second ring gear as the sixth rotation element.

The plurality of engagement elements may include a first clutch mounted between the first shaft and the input shaft, a second clutch mounted between the second shaft and the input shaft, a first brake mounted between the second shaft and the transmission housing, a second brake mounted between the third shaft and the transmission housing, and a first dog clutch mounted between the first shaft and motor shaft and a second dog clutch mounted between the second shaft and the motor shaft.

The first dog clutch may include a clutch drum connected to the motor shaft, having an internal circumference rotatably supported by the transmission housing, and formed with first and second drum gears at internal and external sides, respectively, a first shaft gear formed on the first shaft, a first clutch piston mounted in an interior of the clutch drum, formed with a first guide gear engaged with the first drum gear, formed with a first clutch gear engaged with the first shaft gear to transmit a torque of the motor shaft to the first shaft, forming a hydraulic chamber with the clutch drum, and supported by a return spring, and a first reaction piston mounted in an interior of the clutch drum, supported by a first snap ring and forming a hydraulic chamber with the first clutch piston.

The second dog clutch may share a clutch drum with the first dog clutch, and may include a second shaft gear formed on the second shaft, a second clutch piston mounted in an exterior of the clutch drum, formed with a second guide gear engaged with the second drum gear, formed with a second clutch gear engaged with the second shaft gear to transmit a torque of the motor shaft to the second shaft, forming a hydraulic chamber with the clutch drum, and supported by a return spring, and a second reaction piston mounted in an exterior of the clutch drum, supported by a second snap ring and forming a hydraulic chamber with the second clutch piston.

The plurality of engagement elements may include a first clutch mounted between the first shaft and the input shaft, a second clutch mounted between the second shaft and the input shaft, a third clutch mounted between the first shaft and the motor shaft, a fourth clutch mounted between the second shaft and the motor shaft, a first brake mounted between the second shaft and the transmission housing, and a second brake mounted between the third shaft and the transmission housing.

Another exemplary power transmission apparatus of a hybrid electric vehicle includes an input shaft configured of receiving an engine torque, a motor shaft configured of receiving a torque of a motor/generator, a compound planetary gear set formed as a combination of first and second planetary gear sets sharing a common planet carrier and a common ring gear and thereby having a first rotation element, a second rotation element, a third rotation element, and a fourth rotation element, a first shaft connected to the first rotation element and selectively connectable to each of the input shaft and the motor shaft, a second shaft connect to the second rotation element, and selectively connectable to the input shaft, the motor shaft, and a transmission housing, respectively, a third shaft connect to the third rotation element and selectively connectable to the transmission housing, a fourth shaft fixedly connecting the fourth rotation element and an output gear, and a plurality of engagement elements including at least one clutch and at least one brake.

The compound planetary gear set may be formed in a Ravingneaux type where the first planetary gear set is formed as a double pinion planetary gear set, and the second planetary gear set is formed as a single pinion planetary gear set.

The plurality of engagement elements may include a first clutch mounted between the first shaft and the input shaft, a second clutch mounted between the second shaft and the input shaft, a first brake mounted between the second shaft and the transmission housing, a second brake mounted between the third shaft and the transmission housing, and a dog clutch unit including a first dog clutch mounted between the first shaft and the motor shaft and a second dog clutch mounted between the second shaft and the motor shaft.

The plurality of engagement elements may include a first clutch mounted between the first shaft and the input shaft, a second clutch mounted between the second shaft and the input shaft, a third clutch mounted between the first shaft and the motor shaft, a fourth clutch mounted between the second shaft and the motor shaft, a first brake mounted between the second shaft and the transmission housing, and a second brake mounted between the third shaft and the transmission housing.

According to a power transmission apparatus of a hybrid electric vehicle according to an exemplary embodiment of the present invention, while simplifying the structure of a transmission by employing only two planetary gear sets, various shifting modes, such as an engine mode and a parallel hybrid mode respectively having four shifting stages, two electronically-controlled continuously variable shifting modes (eCVT modes), and an electric vehicle mode (EV mode) having four shifting stages, may be realized, reducing a production cost, and realizing fuel consumption characteristic and power performance above an equivalent transmission.

Furthermore, the number of employed planetary gear sets may be decreased in comparison to a conventional six-speed transmission, and therefore, an overall length may be decreased, improving installability into a vehicle.

Furthermore, an eCVT mode having gear ratios appropriate for a low gear may be realized by employing the dog clutch unit DC, and fuel consumption may be improved by use of the eCVT mode when driving in a city-mode.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Figure 1:
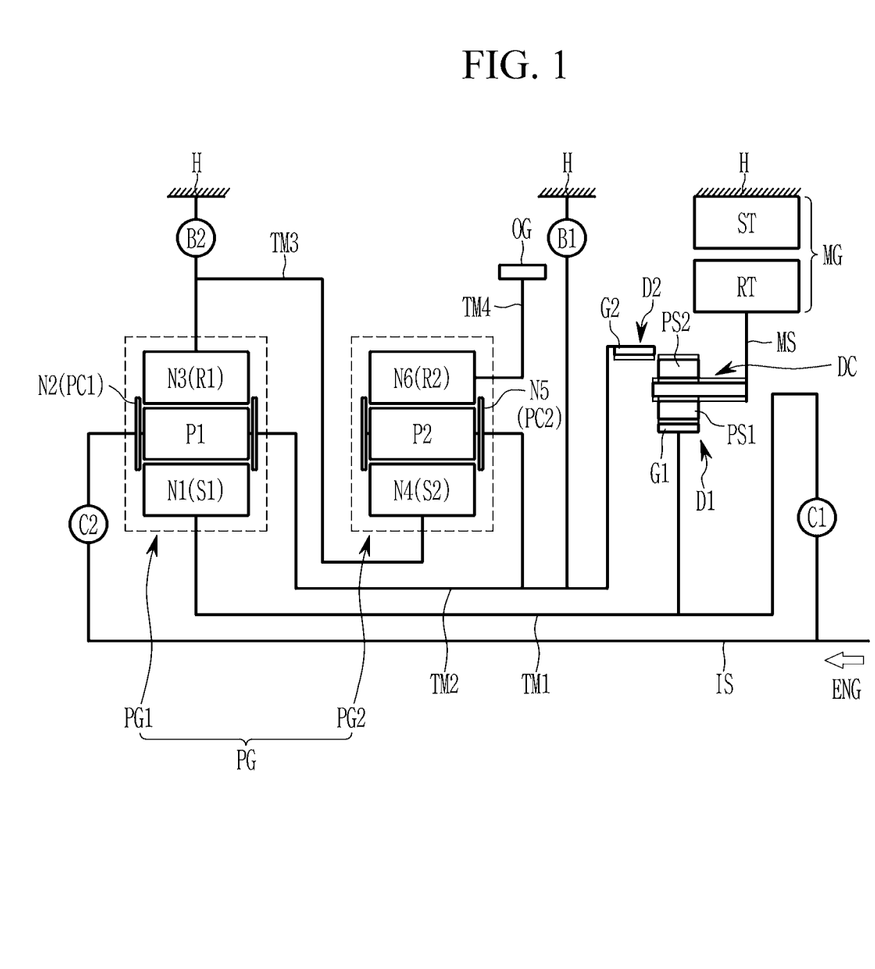
FIG. 1 is a schematic diagram of a power transmission apparatus of a hybrid electric vehicle according to various exemplary embodiments of the present invention.

FIG. 1 is a schematic diagram of a power transmission apparatus of a hybrid electric vehicle according to various exemplary embodiments of the present invention.

Referring to FIG. 1, a power transmission apparatus of a hybrid electric vehicle according to various exemplary embodiments receives torques from power sources of an engine ENG and a motor/generator MG, and includes an input shaft IS, a motor shaft MS, and a planetary gear set portion PG for shifting torques of the engine ENG and the motor/generator MG received from the input shaft IS and the motor shaft MS into four fixed shifting stages and outputting a shifted torque through an output gear OG.

The input shaft IS forms a central axis of a transmission, and always receives the torque of the engine ENG.

The motor shaft MS is connected to a rotor hub of the motor/generator MG, and always receives the torque of the motor/generator MG.

The engine ENG is a primary power source, and may be implemented as one of various types such as a gasoline engine or a diesel engine.

The motor/generator MG is fixedly connected to the planetary gear set portion PG and is used as an auxiliary power source.

The motor/generator MG may act as a motor and also as a generator, and includes a stator ST and a rotor RT, where the stator ST is fixed to a transmission housing H, and the rotor RT is internally mounted within the stator ST and rotatable relative to the stator ST.

The planetary gear set portion PG is formed by a combination of a first planetary gear set PG1 and a second planetary gear set PG2 that are respectively single pinion planetary gear sets.

The first planetary gear set PG1 includes a first sun gear S1 as a first rotation element N1, a first planet carrier PC1 as a second rotation element N2, and a first ring gear R1 as a third rotation element N3, and first, second, and third shafts TM1, TM2, and TM3 are connected thereto.

the second planetary gear set PG2 includes a second sun gear S2 as a fourth rotation element N4, a second planet carrier PC2 as a fifth rotation element N5, and a second ring gear R2 as a sixth rotation element N6, and the second and third shafts TM2 and TM3 and a fourth shaft TM4 are connected thereto.

That is, the planetary gear set portion PG is formed as a combination of the first and second planetary gear sets PG1 and PG2, where the first planet carrier PC1 and the second planet carrier PC2 are fixedly connected and the first ring gear R1 and the second sun gear S2 are fixedly connected.

The first to sixth rotation elements N1 to N6 are fixedly connected to a corresponding one of the shafts TM1 to TM4, and the first and second planetary gear sets PG1 and PG2 are operated by a plurality of engagement elements including at least one clutch and at least one brake.

The four shafts TM1 to TM4 are hereinafter described in detail.

The first shaft TM1 is fixedly connected to the first rotation element N1 (first sun gear S1), and selectively connectable to the input shaft IS and the motor shaft MS, selectively acting as an input element.

The second shaft TM2 fixedly connects the second rotation element N2 (first planet carrier PC1) and the fifth rotation element N5 (second planet carrier PC2). The second shaft TM2 is selectively connectable to the input shaft IS and the motor shaft MS, selectively acting as an input element, and selectively connectable to the transmission housing, selectively acting as a fixed element.

The third shaft TM3 fixedly connects the third rotation element N3 (first ring gear R1) and the fourth rotation element N4 (second sun gear S2), and is selectively connectable to the transmission housing H, selectively acting as a fixed element.

The fourth shaft TM4 is fixedly connected to the sixth rotation element N6 (second ring gear R2), and fixedly connected to the output gear OG, always acting as an output element.

In an exemplary embodiment of the present invention, when two or more members are described to be "fixedly connected", where each of the members may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged.

It may be understood that in the case that a member is "selectively connectable" to a transmission housing by an engagement element, the member may be stationary when the engagement element is engaged.

Engagement elements of first clutch and second clutch C1 and C2 and a dog clutch unit DC including first and second dog clutches D1 and D2 are mounted between a corresponding pair of the four shafts TM1 to TM4 and the input shaft, to form selective connections Engagement elements of first and second brakes B1 and B2 are mounted between the transmission housing H and a corresponding shaft of the four shafts TM1 to TM4, to form selective connections The six engagement elements of the two clutches C1 and C2 and the two dog clutches D1 and D2 and two brakes B1 and B2 are mounted as follows.

The first clutch C1 is mounted between the first shaft TM1 and the input shaft IS, and selectively connects the first shaft TM1 and the input shaft IS, controlling power delivery therebetween.

The second clutch C2 is mounted between the second shaft TM2 and the input shaft IS, and selectively connects the second shaft TM2 and the input shaft IS, controlling power delivery therebetween.

The first dog clutch D1 is mounted between the first shaft TM1 and the motor shaft MS, and selectively connects the first shaft TM1 and the motor shaft MS, controlling power delivery therebetween.

The second dog clutch D2 is mounted between the second shaft TM2 and the motor shaft MS, and selectively connects the second shaft TM2 and the motor shaft MS, controlling power delivery therebetween.

The first brake B1 is mounted between the second shaft TM2 and the transmission housing H, and selectively connects the second shaft TM2 to the transmission housing H.

The second brake B2 is mounted between the third shaft TM3 and the transmission housing H, and selectively connects the third shaft TM3 to the transmission housing H.

The engagement elements of the first clutch and second clutch C1 and C2 and the first and second brakes B1 and B2 may be realized as multi-plate hydraulic pressure friction devices that are frictionally engaged by hydraulic pressure, however, it may not be understood to be limited thereto, since various other configuration that are electrically controllable may be available.

Figure 2:
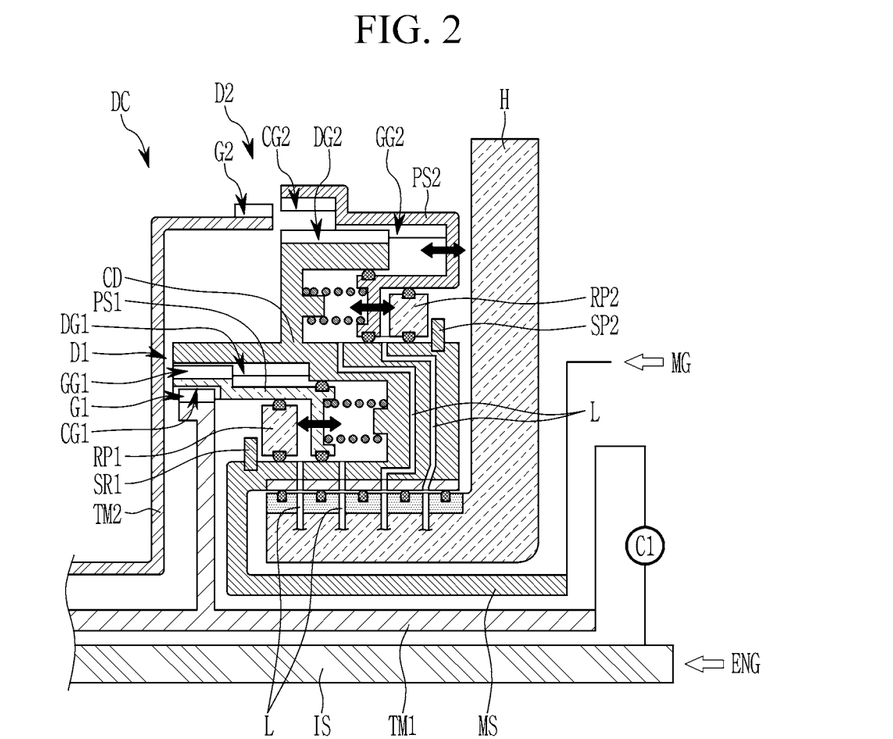
FIG. 2 is a schematic diagram of a two-way system (TWS) applied to a power transmission apparatus of a hybrid electric vehicle according to various exemplary embodiments.

FIG. 2 is a schematic diagram of a two-way system (TWS) applied to a power transmission apparatus of a hybrid electric vehicle according to various exemplary embodiments.

Referring to FIG. 2, the dog clutch unit DC includes two-way system (TWS) having first and second dog clutches D1 and D2.

That is, the dog clutch unit DC includes, as the first and second dog clutches D1 and D2, a clutch drum CD, a first shaft gear G1, a second shaft gear G2, first and second clutch pistons PS1 and PS2, and first and second reaction pistons RP1 and RP2.

The first and second dog clutches D1 and D2 shares the clutch drum CD. The clutch drum CD is connected to the motor shaft MS, and an internal circumference of the clutch drum CD is rotatably supported by the transmission housing H. First and second drum gears DG1 and DG2 are formed on radially internal and external sides of the clutch drum CD, respectively.

In the first dog clutch D1, the first shaft gear G1 is formed on an end portion of the first shaft TM1, and in the second dog clutch D2, the second shaft gear G2 is formed on an end portion of the second shaft TM2.

The first clutch piston PS1 of the first dog clutch D1 is mounted internal to the clutch drum CD, and engaged with the first drum gear DG1. The first clutch piston PS1 is formed with a first guide gear GG1 to guide a movement along an axial direction thereof. The first clutch piston PS1 is formed with a first clutch gear CG1 engaged with the first shaft gear G1 such that a torque of the motor shaft MS is transmitted to the first shaft TM1.

The first clutch piston PS1 and the clutch drum CD form a hydraulic chamber supplied with hydraulic pressure from a hydraulic line L in the transmission housing H and the clutch drum CD The first clutch piston PS1 is supported by a return spring.

The second clutch piston PS2 of the second dog clutch D2 is mounted external to the clutch drum CD, and engaged with the second drum gear DG2. The second clutch piston PS2 is formed with a second guide gear GG2 to guide a movement along an axial direction thereof. The second clutch piston PS2 is formed with a second clutch gear CG2 engaged with the second shaft gear G2 such that a torque of the motor shaft MS is transmitted to the second shaft TM2.

The second clutch piston PS2 and the clutch drum CD form a hydraulic chamber supplied with hydraulic pressure from a hydraulic line L in the transmission housing H and the clutch drum CD. The second clutch piston PS2 is supported by a return spring.

The first reaction piston RP1 of the first dog clutch D1 is mounted internal to the clutch drum CD, and supported in an axial direction by a first snap ring SR1. The first reaction piston RP1 and the first clutch piston PS1 form a hydraulic chamber supplied with hydraulic pressure from a hydraulic line L in the transmission housing H and the clutch drum CD.

The second reaction piston RP2 of the second dog clutch D2 is mounted internal to the clutch drum CD, and supported in an axial direction by a second snap ring SR2, The second reaction piston RP2 and the second clutch piston PS2 form a hydraulic chamber supplied with hydraulic pressure from a hydraulic line L in the transmission housing H and the clutch drum CD.

Figure 3:
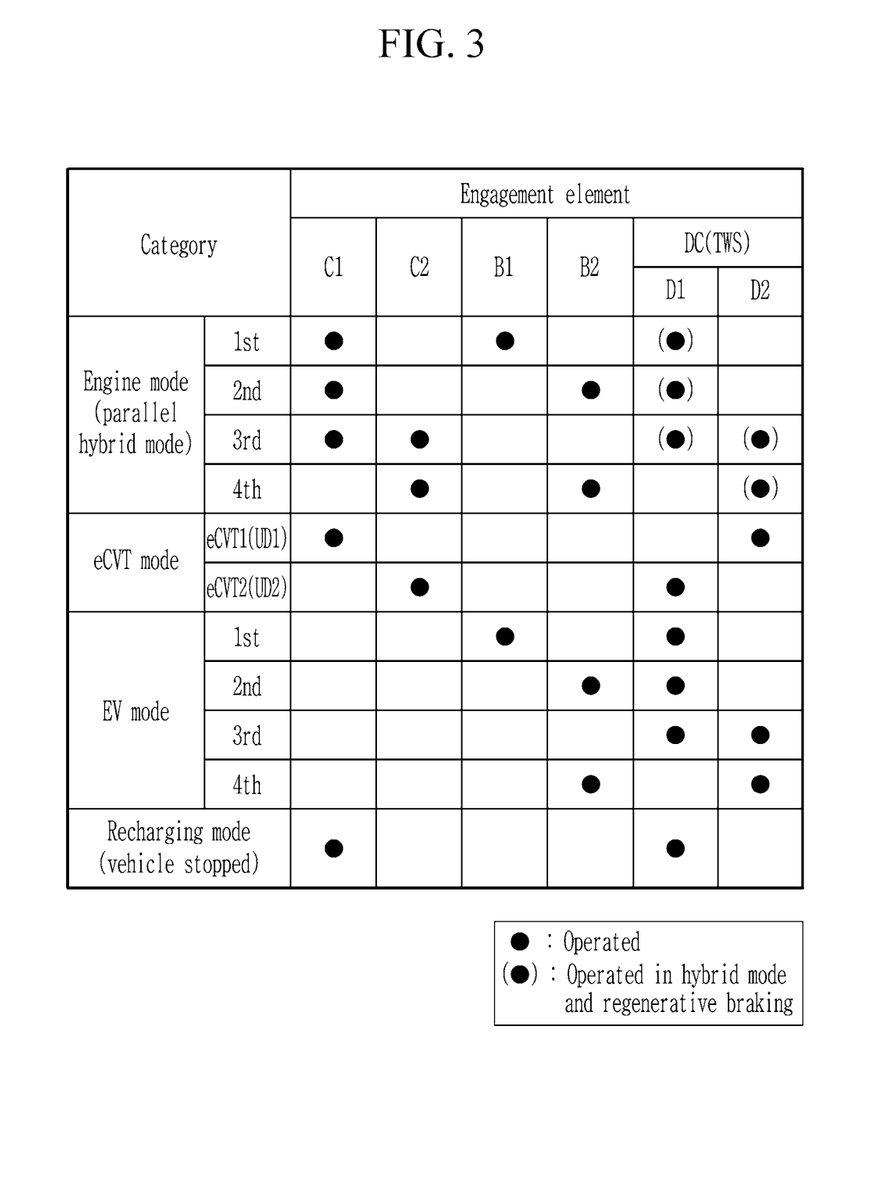
FIG. 3 is a first operation chart of a power transmission apparatus of a hybrid electric vehicle according to various exemplary embodiments.

FIG. 3 is a first operation chart of a power transmission apparatus of a hybrid electric vehicle according to various exemplary embodiments.

Referring to FIG. 3, a power transmission apparatus of a hybrid electric vehicle according to various exemplary embodiments realizes an engine mode (hybrid mode) and an EV mode respectively having four fixed shifting stages, and also realizes an eCVT1 mode and an eCVT2 mode respectively performing electronically-controlled continuously variable shifting.

In the engine mode (hybrid mode), the engine ENG is operated. In the instant state, the torque of the engine ENG is input to the planetary gear set portion PG by operation of at least one of the first clutch C1 and the second clutch C2, and the first and second brakes B1 and B2 are controlled to realize four fixed shifting stages.

According to selective operation of the first and second dog clutches D1 and D2 of the dog clutch unit DC, the torque of the motor/generator MG is input to the planetary gear set portion PG as an auxiliary torque, realizing a hybrid mode.

In the eCVT1 mode, the engine ENG is operated at a fixed rotation speed, and the first clutch C1 is engaged to transmit the torque of the engine ENG to the first rotation element N1. Simultaneously, the second dog clutch D2 is engaged to transmit the torque of the motor/generator MG to the second rotation element N2, and the rotation speed of the motor/generator MG is varied to vary gear ratio of the transmission to achieve gear ratios for a low gear (gear ratio above 1.0).

In the eCVT2 mode, the engine ENG is operated at a fixed rotation speed, and the second clutch C2 is engaged to transmit the torque of the engine ENG to the second rotation element N2. Simultaneously, the first dog clutch D1 is engaged to transmit the torque of the motor/generator MG to the first rotation element N1, and the rotation speed of the motor/generator MG is varied to vary gear ratio of the transmission to achieve gear ratios for a high gear (gear ratio of 1.0 to 2.5).

In the EV mode, the first clutch and second clutch C1 and C2 are released to disconnect the planetary gear set portion PG from the engine ENG, and simultaneously, the first dog clutch D1 is engaged to transmit the torque of the motor/generator MG to the first rotation element N1. Similarly to the engine mode, the first and second brakes B1 and B2 are controlled to realize three EV mode low speed fixed shifting stages. Furthermore, the second dog clutch D2 is engaged to transmit the torque of the motor/generator MG to the second rotation element N2, and the second brake B2 is controlled to realize one EV mode high speed fixed shift-stage.

Here, the engine mode (hybrid mode), the eCVT1 mode, and the eCVT2 mode may be combined to realize a shifting mode of at least six speeds.

More An engine mode third forward speed and an engine mode fourth forward speed, which are respectively 1:1 and overdrive ranges, may be used as a fifth forward speed and a sixth forward speed, respectively. An engine mode second forward speed may be used as a third forward speed. An engine mode first forward speed may be used as a first forward speed. An eCVT1 mode having a gear ratio appropriate for a low gear may be used as a second forward speed intervening between the first forward speed and the third forward speed. An eCVT2 mode having a gear ratio appropriate for a high gear is used as a fourth forward speed intervening between the third forward speed and the fifth forward speed.

Hereinafter, an operation of a power transmission apparatus of a hybrid electric vehicle according to various exemplary embodiments is described in detail in connection with respective modes.

[Engine Mode First Forward Speed (Hybrid Mode First Forward Speed)]

In an engine mode first forward speed, the engine ENG is operated, and the first clutch C1 and the first brake B1 are simultaneously operated.

Accordingly, the second shaft TM2 of the planetary gear set portion PG acts as a fixed element by the operation of the first brake B1. In the instant state, by the operation of the first clutch C1, the torque of the engine ENG is input to the first rotation element N1 through the first shaft TM1.

As a result, a reduced speed output is delivered to the sixth rotation element N6 of the planetary gear set portion PG, and the torque of an engine mode first forward speed is output through the output gear OG connected to the sixth rotation element N6 through the fourth shaft TM4.

Here, when the first dog clutch D1 is engaged while driving the motor/generator MG, the torque of the motor/generator MG is added to the first shaft TM1, realizing a hybrid mode first forward speed.

[Engine Mode Second Forward Speed (Hybrid Mode Second Forward Speed)]

In an engine mode second forward speed, the engine ENG is operated, and the first clutch C1 and the second brake B2 are simultaneously operated.

Accordingly, the third shaft TM3 of the planetary gear set portion PG acts as a fixed element by the operation of the second brake B2. In the instant state, by the operation of the first clutch C1, the torque of the engine ENG is input to the first rotation element N1 through the first shaft TM1.

As a result, a reduced speed output is delivered to the sixth rotation element N6 of the compound planetary gear set CPG, and the torque of an engine mode second forward speed is output through the output gear OG connected to the sixth rotation element N6 through the fourth shaft TM4.

Here, when the first dog clutch D1 is engaged while driving the motor/generator MG, the torque of the motor/generator MG is added to the first shaft TM1, realizing a hybrid mode second forward speed.

[Engine Mode Third Forward Speed (Hybrid Mode Third Forward Speed)]

In an engine mode third forward speed, the engine ENG is operated, and the first clutch and second clutch C1 and C2 are simultaneously operated.

Accordingly, in the planetary gear set portion PG, by the operation of the first clutch and second clutch C1 and C2, the torque of the engine ENG simultaneously input to the first shaft TM1 and the second and fifth rotation elements N2 and N5. Therefore, the first and second planetary gear sets PG1 and PG2 integrally rotates.

As a result, an input torque is directly output (at a ratio of 1:1) through the output gear OG connected to the sixth rotation element N6 through the fourth shaft TM4, outputting a torque of engine mode third forward speed.

Here, when the first dog clutch D1 or second dog clutch D2 is engaged while driving the motor/generator MG, the torque of the motor/generator MG is input to the first shaft TM1 or the second shaft TM2, realizing a hybrid mode third forward speed.

[Engine Mode Fourth Forward Speed (Hybrid Mode Fourth Forward Speed)]

In an engine mode fourth forward speed, the engine ENG is operated, and the second clutch C2 and the second brake B2 are simultaneously operated.

Accordingly, the third shaft TM3 of the planetary gear set portion PG acts as a fixed element by the operation of the second brake B2. In the instant state, by the operation of the second clutch C2, the torque of the engine ENG is input to the second and fifth rotation elements N2 and N5 through the second shaft TM2.

As a result, an increased speed output is delivered to the sixth rotation element N6 of the planetary gear set portion PG, and the torque of an engine mode fourth forward speed, which is an overdrive range, is output through the output gear OG connected to the sixth rotation element N6 through the fourth shaft TM4.

Here, when the second dog clutch D2 is engaged while driving the motor/generator MG, the torque of the motor/generator MG is added to the second shaft TM2, realizing a hybrid mode fourth forward speed.

In such an engine mode, while a vehicle is stopped with the engine ENG running, the first clutch C1 and the first dog clutch D1 may be operated to transmit the torque of the engine ENG to the motor/generator MG to generate electricity to recharge a battery.

[eCVT1 Mode]

In the eCVT1 mode, the engine ENG is operated at a fixed rotation speed, and the first clutch C1 and the second dog clutch D2 are operated.

Accordingly, in the planetary gear set portion PG, by the operation of the first clutch C1, the torque of the engine ENG is transmitted to the first rotation element N1 through the first shaft TM1, and simultaneously, by the operation of the second dog clutch D2, the torque of the motor/generator MG is transmitted to the second and fifth rotation elements N2 and N5 through the second shaft TM2.

In such a state, an eCVT1 mode having gear ratios appropriate for a low gear may be realized by varying the rotation speed of the motor/generator MG.

[eCVT2 Mode]

In the eCVT2 mode, the engine ENG is operated at a fixed rotation speed, and the second clutch C2 and the first dog clutch D1 are operated.

Accordingly, in the planetary gear set portion PG, by the operation of the second clutch C2, the torque of the engine ENG is transmitted to the second and fifth rotation elements N2 and N5 through the second shaft TM2, and simultaneously, by the operation of the first dog clutch D1, the torque of the motor/generator MG is transmitted to the first rotation element N1 through the first shaft TM1.

In such a state, an eCVT2 mode having gear ratios appropriate for a high gear may be realized by varying the rotation speed of the motor/generator MG.

[EV Mode First Speed]

In an EV mode first speed, the first clutch and second clutch C1 and C2 is released to disconnect the engine ENG. In the instant state, the first brake B1 and the first dog clutch D1 are simultaneous operated and the motor/generator MG is operated.

Accordingly, the second shaft TM2 of the planetary gear set portion PG acts as a fixed element by the operation of the first brake B1. In the instant state, by the operation of the first dog clutch D1, the torque of the motor/generator MG is input to the first rotation element N1 through the first shaft TM1.

As a result, a reduced speed output is delivered to the sixth rotation element N6 of the compound planetary gear set CPG, and the torque of EV mode first speed is output through the output gear OG connected to the sixth rotation element N6 through the fourth shaft TM4.

[EV Mode Second Speed]

In an EV mode second speed, the first clutch and second clutch C1 and C2 is released to disconnect the engine ENG. In the instant state, the second brake B2 and the first dog clutch D1 are simultaneous operated and the motor/generator MG is operated.

Accordingly, the third shaft TM3 of the planetary gear set portion PG acts as a fixed element by the operation of the second brake B2. In the instant state, by the operation of the first dog clutch D1, the torque of the motor/generator MG is input to the first rotation element N1 through the first shaft TM1.

As a result, a reduced speed output is delivered to the sixth rotation element N6 of the compound planetary gear set CPG, and the torque of EV mode second speed is output through the output gear OG connected to the sixth rotation element N6 through the fourth shaft TM4.

[EV Mode Third Speed]

In an EV mode third speed, the first clutch and second clutch C1 and C2 is released to disconnect the engine ENG. In the instant state, the first and second dog clutches D1 and D2 are simultaneous operated, and the motor/generator MG is operated.

Accordingly, in the planetary gear set portion PG, by the operation of the first and second dog clutches D1 and D2, the torque of the motor/generator MG simultaneously input to the first shaft TM1 and the second and fifth rotation elements N2 and N5. Therefore, the first and second planetary gear sets PG1 and PG2 integrally rotates.

As a result, an input torque is directly output (at a ratio of 1:1) through the output gear OG connected to the sixth rotation element N6 through the fourth shaft TM4, outputting a torque of EV mode third speed.

[EV Mode Fourth Speed]

In an EV mode fourth speed, the first clutch and second clutch C1 and C2 is released to disconnect the engine ENG.

In the instant state, the second brake B2 and the second dog clutch D2 are simultaneous operated and the motor/generator MG is operated.

Accordingly, the third shaft TM3 of the planetary gear set portion PG acts as a fixed element by the operation of the second brake B2. In the instant state, by the operation of the second dog clutch D2, the torque of the motor/generator MG is input to the second and fifth rotation elements N2 and N5 through the second shaft TM2.

As a result, an increased speed output is delivered to the sixth rotation element N6 of the planetary gear set portion PG, and the torque of EV mode fourth forward speed is output through the output gear OG connected to the sixth rotation element N6 through the fourth shaft TM4.

Figure 4:
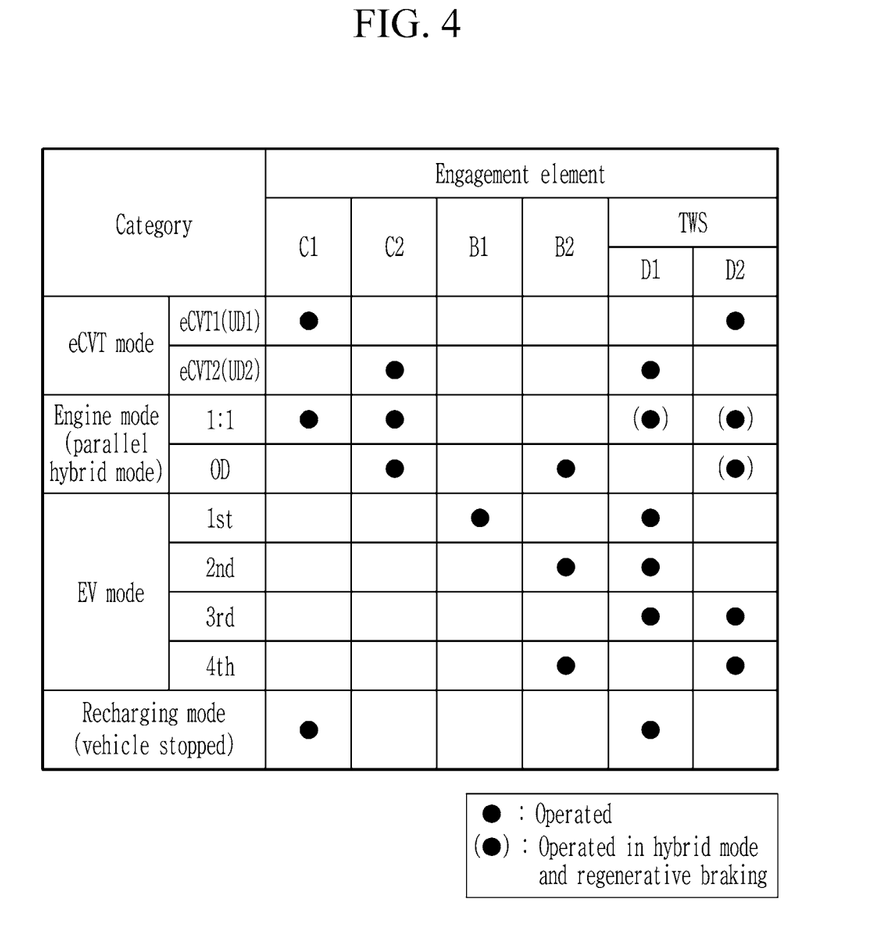
FIG. 4 is a second operation chart of a power transmission apparatus of a hybrid electric vehicle according to various exemplary embodiments.

FIG. 4 is a second operation chart of a power transmission apparatus of a hybrid electric vehicle according to various exemplary embodiments.

Referring to FIG. 4, a power transmission apparatus of a hybrid electric vehicle according to various exemplary embodiments may realize shifting modes according to the second operational chart.

According to the second operational chart, the eCVT1 mode and the eCVT2 mode are used to realize low speed shifting stages, that is, having higher shift ratios than a ratio of 1:1.

Furthermore, the shift-stage 1:1 is the same as the engine mode third forward speed (hybrid mode third forward speed) described in connection with the first operation chart of FIG. 3, and the high speed shift-stage OD having a gear ratio lower than 1:1 is the same as the engine mode fourth forward speed (hybrid mode fourth forward speed) described in connection with the first operation chart of FIG. 3.

Furthermore, an EV mode may be realized in the same way as in the first operation chart of FIG. 3.

It may be understood that the shifting modes according to the second operation chart of FIG. 4 is realized in the same way as described in connection with the first operation chart of FIG. 3, and therefore, are not further described in detail.

Figure 5:
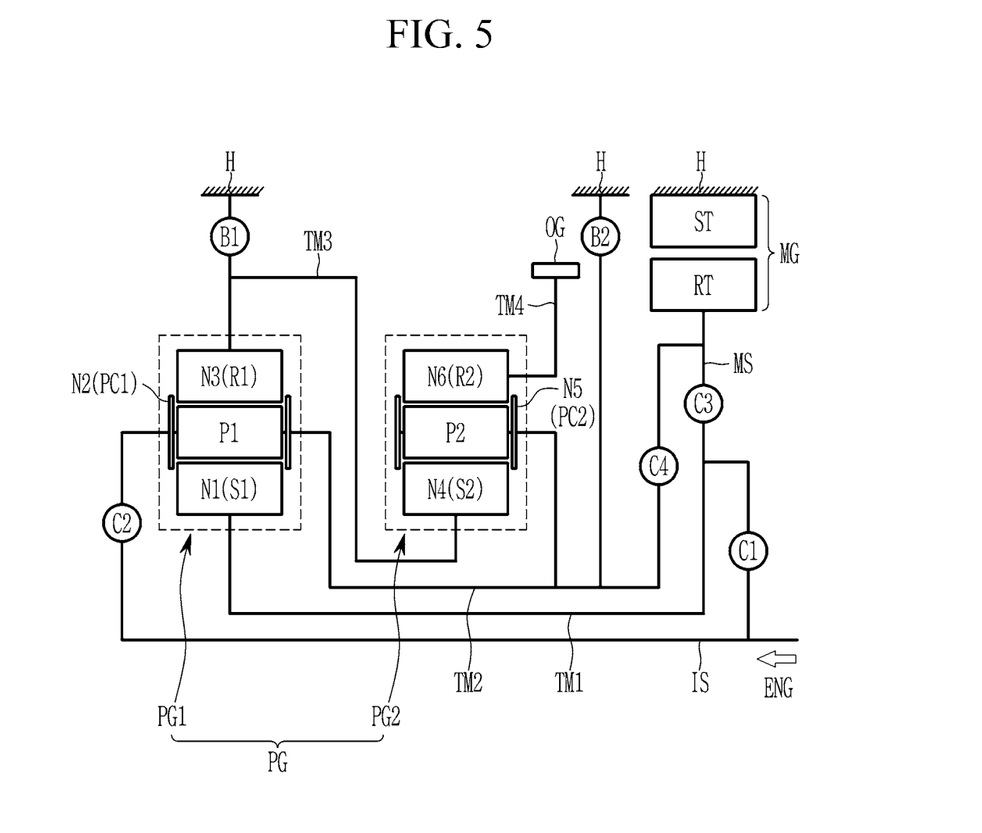
FIG. 5 is a schematic diagram of a power transmission apparatus of a hybrid electric vehicle according to various exemplary embodiments of the present invention.

FIG. 5 is a schematic diagram of a power transmission apparatus of a hybrid electric vehicle according to various exemplary embodiments of the present invention.

Referring to FIG. 5, a power transmission apparatus of a hybrid electric vehicle according to various exemplary embodiments differs from the various exemplary embodiments in that the dog clutch unit DC as two-way system (TWS) is replaced with two clutches C3 and C4.

That is, the first dog clutch D1 of the dog clutch unit DC is replaced with the third clutch C3, and the second dog clutch D2 is replaced with the fourth clutch C4.

As a result, a power transmission apparatus of a hybrid electric vehicle according to various exemplary embodiments various exemplary embodiments merely differ from the various exemplary embodiments in that the third and fourth clutches C3 and C4 are used instead of first and second dog clutches D1 and D2, and other features remain the same.

Furthermore, shifting modes may be realized in the same as in the various exemplary embodiments of the present invention, except that the third and fourth clutches C3 and C4 are operated instead of the first and second dog clutches D1 and D2 in the first and second operational charts, and therefore shifting operation is not further described in detail.

Figure 6:
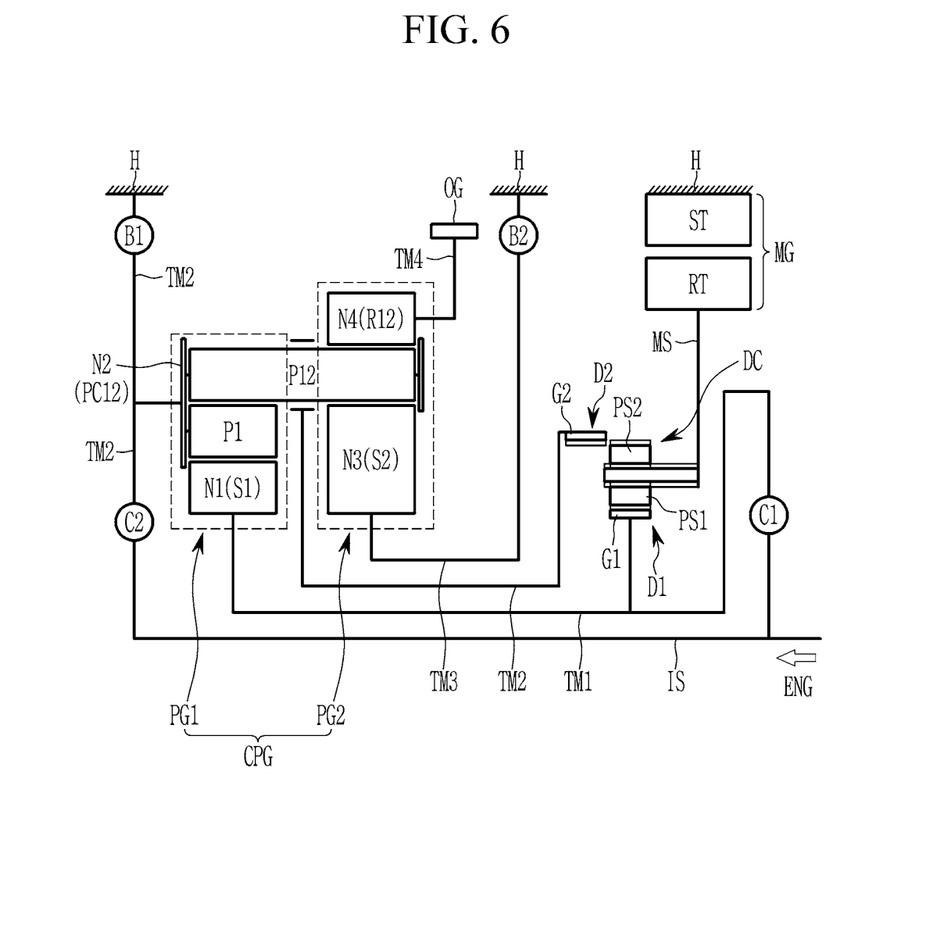
FIG. 6 is a schematic diagram of a power transmission apparatus of a hybrid electric vehicle according to various exemplary embodiments of the present invention.

FIG. 6 is a schematic diagram of a power transmission apparatus of a hybrid electric vehicle according to various exemplary embodiments of the present invention.

Referring to FIG. 6, a power transmission apparatus of a hybrid electric vehicle according to various exemplary embodiments differs from the various exemplary embodiments in that the compound planetary gear set CPG is formed in a Ravingneaux type sharing a planet carrier and a ring gear in a combination of a first planetary gear set PG1 of a double pinion planetary gear set and a second planetary gear set PG2 of a single pinion planetary gear set, instead of forming planetary gear set portion PG as a combination of first and second planetary gear sets PG1 and PG2 that are respectively single pinion planetary gear sets.

That is, the compound planetary gear set CPG is formed by a combination of the first and second planetary gear sets PG1 and PG2 having a common planet carrier PC12 and a common ring gear R12, and thereby forms a first rotation element, a second rotation element, a third rotation element, and a fourth rotation element N1, N2, N3, and N4, and first shaft TM1, second shaft TM2, third shaft TM3, fourth shaft TM4 are connected thereto.

As a result, the first shaft TM1 is fixedly connected to the first rotation element N1 (first sun gear S1), and selectively connectable to the input shaft IS and the motor shaft MS, selectively acting as an input element.

The second shaft TM2 is fixedly connected to the second rotation element (N2; common planet carrier PC12), selectively connectable to the input shaft IS and the motor shaft MS, selectively acting as an input element, and selectively connectable to the transmission housing, selectively acting as a fixed element.

The third shaft TM3 is fixedly connected to the third rotation element (N3; second sun gear S2), and selectively connectable to the transmission housing H, selectively acting as a fixed element.

The fourth shaft TM4 is fixedly connected to the fourth rotation element N4 (common ring gear R12), and fixedly connected to the output gear OG, always acting as an output element.

Furthermore, a power transmission apparatus of a hybrid electric vehicle according to various exemplary embodiments is the same as the various exemplary embodiments of the present invention, in the arrangement of the four shafts TM1 to TM4 and engagement elements, which is not further described in detail.

Furthermore, shifting modes may be realized in the same way as in the first and second operational charts of the various exemplary embodiments of the present invention, and therefore shifting operation is not further described in detail.

Figure 7:
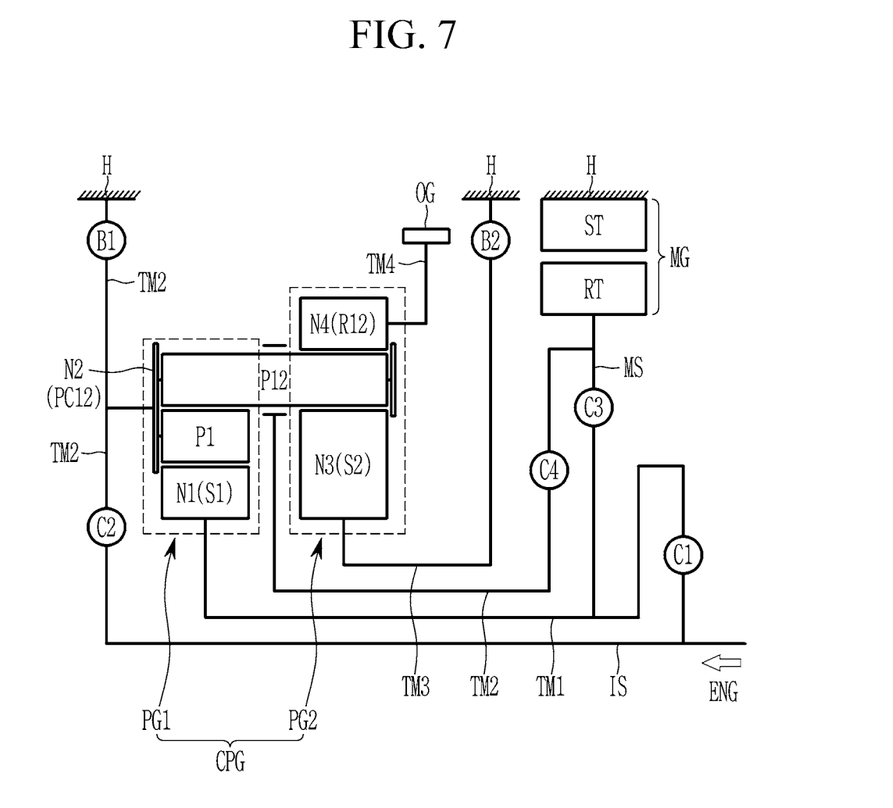
FIG. 7 is a schematic diagram of a power transmission apparatus of a hybrid electric vehicle according to various exemplary embodiments of the present invention.

FIG. 7 is a schematic diagram of a power transmission apparatus of a hybrid electric vehicle according to various exemplary embodiments of the present invention.

Referring to FIG. 7, a power transmission apparatus of a hybrid electric vehicle according to various exemplary embodiments differs from the various exemplary embodiments in that the dog clutch unit DC as two-way system (TWS) is replaced with two clutches C3 and C4.

That is, the first dog clutch D1 of the dog clutch unit DC is replaced with the third clutch C3, and the second dog clutch D2 is replaced with the fourth clutch C4.

As a result, a power transmission apparatus of a hybrid electric vehicle according to various exemplary embodiments various exemplary embodiments merely differ from the various exemplary embodiments in that the third and fourth clutches C3 and C4 are used instead of first and second dog clutches D1 and D2, and other features remain the same.

Furthermore, shifting modes may be realized in the same as in the various exemplary embodiments of the present invention, except that the third and fourth clutches C3 and C4 are operated instead of the first and second dog clutches D1 and D2 in the first and second operational charts, and therefore shifting operation is not further described in detail.

As described above, a power transmission apparatus of a hybrid electric vehicle according to exemplary embodiments employs only two planetary gear sets PG1 and PG2, simplifying the structure of a transmission. Furthermore, an engine mode and a parallel hybrid mode respectively having six speeds and two electronically-controlled continuously variable shifting modes (eCVT modes) may be combined to realize various shifting modes having more than four speeds, reducing a production cost, and realizing fuel consumption characteristic and power performance above an equivalent transmission.

Furthermore, the number of employed planetary gear sets may be decreased in comparison to a conventional six-speed transmission, and therefore, an overall length may be decreased, improving installability.

Furthermore, by applying the dog clutch unit DC as a two-way system (TWS), an eCVT mode having gear ratios appropriate for a low gear may be realized, and fuel consumption may be improved by use of the eCVT mode when driving in a city-mode.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus of a hybrid electric vehicle, the power transmission apparatus comprising:
   an input shaft configured of receiving an engine torque;
   a motor shaft configured of receiving a torque of a motor/generator;
   a first planetary gear set having a first rotation element, a second rotation element, and a third rotation element and mounted on the input shaft;
   a second planetary gear set having a fourth rotation element, a fifth rotation element, and a sixth rotation element and mounted on the input shaft;
   a first shaft fixedly connected to the first rotation element and selectively connectable to each of the input shaft and the motor shaft, independently, so that the first shaft is connected to either one of the input shaft and the motor shaft while being disconnected to another one of the input shaft and the motor shaft, or is connected to both of the input shaft and the motor shaft;

a second shaft fixedly connecting the second rotation element and the fifth rotation element, and selectively connectable to the input shaft, the motor shaft, and a transmission housing, respectively;

a third shaft fixedly connecting the third rotation element and the fourth rotation element and selectively connectable to the transmission housing;

a fourth shaft fixedly connecting the sixth rotation element and an output gear; and a plurality of engagement elements including at least one clutch and at least one brake.

2. The power transmission apparatus of claim 1, wherein the first planetary gear set is formed as a single pinion planetary gear set having a first sun gear as the first rotation element, a first planet carrier as the second rotation element, and a first ring gear as the third rotation element, and wherein the second planetary gear set is formed as a single pinion planetary gear set having a second sun gear as the fourth rotation element, a second planet carrier as the fifth rotation element, and a second ring gear as the sixth rotation element.

3. The power transmission apparatus of claim 1, wherein the at least one clutch of the plurality of engagement elements includes:

a first clutch mounted between the first shaft and the input shaft;

a second clutch mounted between the second shaft and the input shaft;

wherein the at least one brake of the plurality of engagement elements includes:

a first brake mounted between the second shaft and the transmission housing; and a second brake mounted between the third shaft and the transmission housing, and wherein the plurality of engagement elements further includes:

a first dog clutch mounted between the first shaft and motor shaft and a second dog clutch mounted between the second shaft and the motor shaft.

4. The power transmission apparatus of claim 3, wherein the first dog clutch includes:

a clutch drum connected to the motor shaft, having an internal circumference rotatably supported by the transmission housing, and formed with first and second drum gears at internal and external sides of the clutch drum, respectively;

a first shaft gear formed on the first shaft;

a first clutch piston mounted in an interior of the clutch drum, formed with a first guide gear engaged with the first drum gear, formed with a first clutch gear engaged with the first shaft gear to transmit a torque of the motor shaft to the first shaft, forming a first hydraulic chamber with the clutch drum, and supported by an elastic member; and a first reaction piston mounted in the interior of the clutch drum, supported by a first snap ring and forming a second hydraulic chamber with the first clutch piston.

5. The power transmission apparatus of claim 3, wherein the second dog clutch shares a clutch drum with the first dog clutch, and wherein the second dog clutch includes:

a second shaft gear formed on the second shaft;

a second clutch piston mounted in an exterior of the clutch drum, formed with a second guide gear engaged with a second drum gear, formed with a second clutch gear engaged with the second shaft gear to transmit a torque of the motor shaft to the second shaft, forming a first hydraulic chamber with the clutch drum, and supported by an elastic member; and a second reaction piston mounted in the exterior of the clutch drum, supported by a second snap ring and forming a second hydraulic chamber with the second clutch piston.

6. The power transmission apparatus of claim 1, wherein the at least one clutch of the plurality of engagement elements includes:

a first clutch mounted between the first shaft and the input shaft;

a second clutch mounted between the second shaft and the input shaft;

a third clutch mounted between the first shaft and the motor shaft; and a fourth clutch mounted between the second shaft and the motor shaft, wherein the at least one brake of the plurality of engagement elements includes:

a first brake mounted between the second shaft and the transmission housing; and a second brake mounted between the third shaft and the transmission housing.

* * * * *